United States Patent

Barzideh et al.

[11] Patent Number: 5,943,760
[45] Date of Patent: Aug. 31, 1999

[54] STEPPER MOTOR AND METHOD OF MANUFACTURE

[75] Inventors: Bijan Barzideh, Rush; Richard N. Capobianco; Gary R. Kenny, both of Rochester; Joseph M. Kessler, Spencerport; Athimoottil Mathew; James Palmer, both of Pittsford; Timothy F. Spencer, Rochester, all of N.Y.

[73] Assignee: Eastman Kodak Company, Rochester, N.Y.

[21] Appl. No.: 08/814,623

[22] Filed: Mar. 10, 1997

Related U.S. Application Data

[62] Division of application No. 08/613,730, Feb. 9, 1996, abandoned.

[51] Int. Cl.[6] .............................. H02K 15/02; H02K 1/04
[52] U.S. Cl. .............................. 29/596; 29/598; 310/43; 310/49 R; 310/154; 310/194
[58] Field of Search .............................. 310/42, 43, 49 R, 310/154, 162, 194, 89, 257, 258; 29/596, 598, 605, 607

[56] References Cited

U.S. PATENT DOCUMENTS

| | | |
|---|---|---|
| 4,352,036 | 9/1982 | Kuwako ................................ 310/83 |
| 4,714,850 | 12/1987 | Akiba et al. ......................... 310/49 R |
| 4,818,911 | 4/1989 | Taguchi et al. ......................... 310/259 |
| 4,841,190 | 6/1989 | Matsushita et al. ..................... 310/257 |
| 5,004,941 | 4/1991 | Ohzeki et al. .......................... 310/49 |
| 5,020,211 | 6/1991 | Nakagawa et al. ...................... 29/596 |
| 5,113,107 | 5/1992 | Atsumi et al. ......................... 310/256 |
| 5,121,017 | 6/1992 | Yamamoto et al. ...................... 29/596 |
| 5,170,082 | 12/1992 | Nakagawa et al. ...................... 310/45 |
| 5,331,237 | 7/1994 | Ichimura ................................ 310/44 |
| 5,465,020 | 11/1995 | Peterson ................................ 310/194 |
| 5,685,062 | 11/1997 | McCarthy et al. ....................... 29/598 |
| 5,829,119 | 11/1998 | Matsushita et al. ..................... 29/598 |

*Primary Examiner*—Lee W. Young
*Assistant Examiner*—A. Dexter Tugbang
*Attorney, Agent, or Firm*—Thomas H. Close

[57] ABSTRACT

A method of making stepper motor includes: providing a permanent magnet rotor carried by an output shaft; forming a bobbin having an alignment feature, a bearing opening for supporting the shaft, and a passage for receiving the permanent magnet rotor; forming a magnetically soft stator-yoke located around the inside of the passage; winding a coil of electrically conducting wire around the bobbin; and providing a motor housing for receiving the bobbin and where the motor housing has a corresponding alignment feature to align the bobbin with the housing.

6 Claims, 6 Drawing Sheets

STEPPER MOTOR AND METHOD OF MANUFACTURE

CROSS REFERENCE TO REFERENCE TO RELATED APPLICATIONS

This is a divisional of application U.S. Ser. No. 08/613,730, filed Feb. 9, 1996, now abandoned.

FIELD OF THE INVENTION

The invention relates generally to the field of DC motors, and in particular to permanent magnet stepper motors.

BACKGROUND OF THE INVENTION

Permanent magnet stepper motors are currently used in a wide variety of apparatus including cameras, printers and scanners. Their ability to effect discrete and precise movement makes them the preferred choice for driving mechanical elements in this type of equipment.

Figure 1:
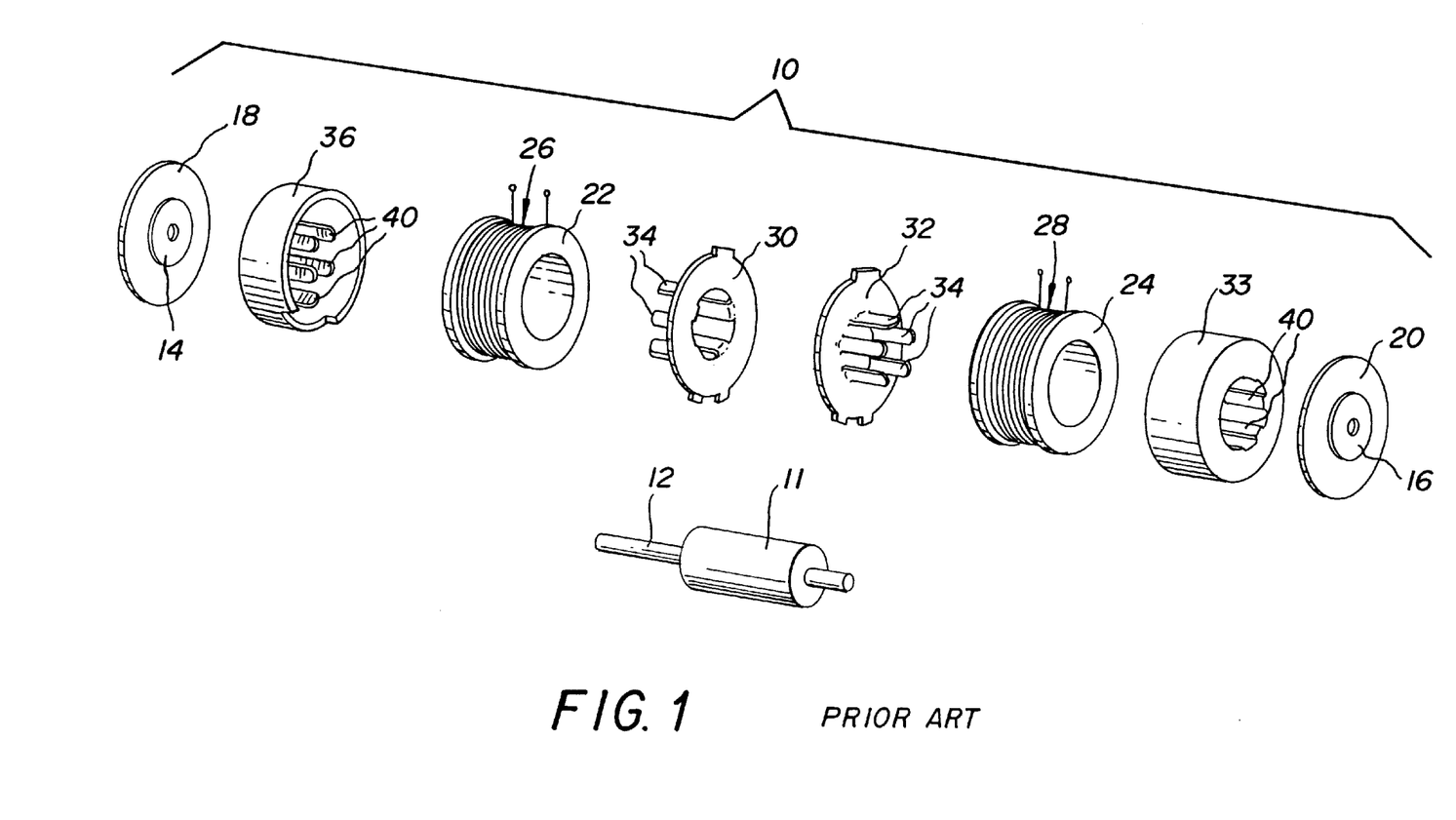
FIG. 1 is an exploded perspective view of a prior art stepper motor.

Referring to FIG. 1, an exploded perspective view of a permanent magnet stepper motor of the type known in the prior art is shown. The stepper motor 10 includes a multi-pole permanent magnet rotor 11 carried by a shaft 12. The shaft 12 is mounted for rotation in front and back bearings 14 and 16 respectively. The bearings are mounted in front and back end plates 18 and 20. A pair of plastic bobbins 22 and 24 carry a pair of coils 26 and 28. A pair of soft magnetic metal stator yokes 30 and 32 each having a plurality of stator fingers 34, and a pair of soft magnetic stator shells 36 and 38, each having a corresponding plurality of stator fingers 40 are arranged such that the stator fingers 34 and 40 extend into the plastic bobbins in an interdigitated fashion to form stator poles when current is applied to the coils 26 and 28. The front and back end plates 18 and 20 are mounted on the outside ends of the stator shells 36 and 38, and the rotor 11 is supported by shaft 12 for rotation within the bobbins 22 and 24. The stator fingers in bobbin 22 are angularly offset from the fingers in bobbin 24 by one half the finger spacing so that current can be alternately applied to coils 26 and 28 to turn the rotor 10 in a stepwise fashion, thereby applying torque to shaft 12.

The manufacture and assembly of such stepper motors is presently a complex process requiring many steps and critical alignments, thereby making the motors relatively expensive. There is a need for an improved motor design and assembly method that is adapted to robotic automated assembly to reduce the cost and improve the reliability of the motors.

SUMMARY OF THE INVENTION

The present invention is directed to overcoming one or more of the problems set forth above. Briefly summarized, according to one aspect of the present invention, a stepper motor includes an output shaft; a permanent magnet rotor carried by the output shaft; a bobbin having an alignment feature and defining a bearing for supporting the shaft and a passage for receiving the permanent magnet rotor; a magnetically soft stator-yoke located around the inside of the passage; a coil wound around the bobbin; and a motor housing for receiving the bobbin and having a complementary alignment feature to align the bobbin within the housing.

According to another aspect of the invention, the bobbin with the stator yoke is formed by insertion molding. According to another aspect of the invention, the bobbin with the stator yoke is formed by electroforming and insertion molding. According to yet another aspect of the invention, the bobbin with the stator yoke is formed by two step injection molding and plating.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 2:
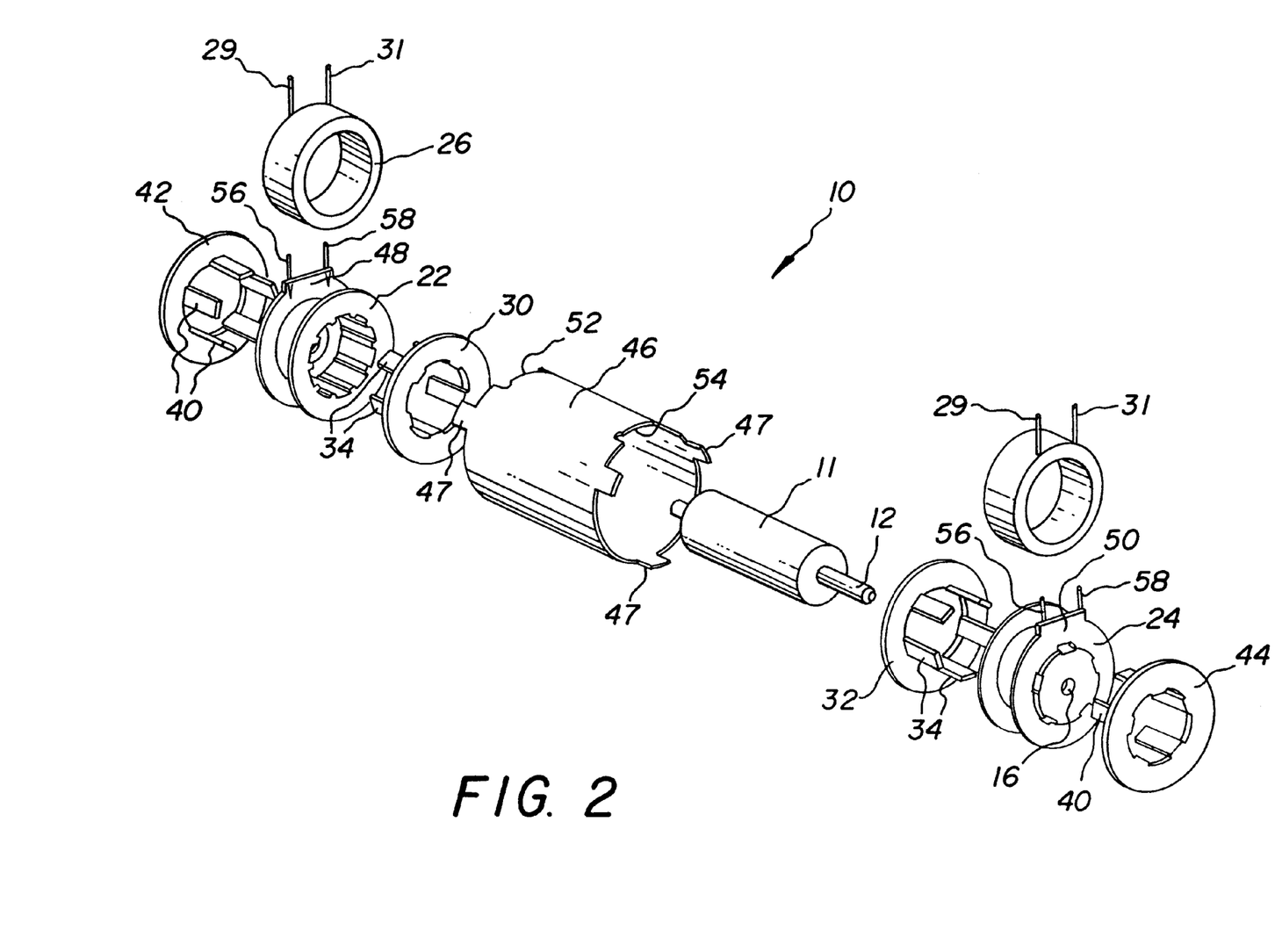
FIG. 2 is an exploded perspective view of a stepper motor according to the present invention.

FIG. 2 shows an exploded perspective view of a stepper motor according to the present invention. The stepper motor, generally designated 10, includes a multi-pole permanent magnet rotor 11 carried by a shaft 12. The shaft 12 is mounted for rotation in front and back bearings that are formed as integral parts of plastic bobbins 22 and 24. Only back bearing 16 is shown in FIG. 2. The bobbins carry a pair of coils 26 and 28 each having leads 29 and 31. A pair of soft magnetic metal stator yokes 30 and 32 each having a plurality of stator fingers 34, and a second pair of soft magnetic stator yokes 42 and 44, each having a corresponding plurality of stator fingers 40 are arranged such that the stator fingers 34 and 40 extend into the plastic bobbins 22 and 24 in an interdigitated fashion to form stator poles when current is applied to the coils 26 and 28. The bobbin, coil and stator yokes form a bobbin assembly. Both bobbin assemblies are enclosed in a soft magnetic housing 46 that is twice the length of one of the bobbin assemblies. The housing 46 includes tabs 47 for securing the bobbin assemblies in the motor housing.

The rotor 11 is supported by shaft 12 for rotation within the bobbins. The stator fingers in the bobbin 22 are angularly offset from the fingers in bobbin 24 by one half the finger spacing so that current can be alternately applied to coils 26 and 28 to turn the rotor 11 in a stepwise fashion thereby applying torque to shaft 12. This angular offset is achieved by alignment features comprising tabs 48 and 50 on bobbins 22 and 24 respectively that cooperate with complementary alignment features comprising cutouts 52 and 54 on the housing 46. Tabs 48 and 50 each support electrical termination pins 56 and 58.

In the stepper motor manufacturing process, the bobbin assemblies are fabricated by forming the bobbins with the stator yokes, winding the coils 26 and 28 on the bobbins 22 and 24 and connecting the leads 29 and 31 to the termination pins 56 and 58 respectively. The rotor 11 is inserted between the two bobbin assemblies in the housing 46 using the alignment features to align the bobbin assemblies in the housing. Finally the tabs 47 on the housing 46 are crimped over the outside edges of the bobbin assemblies to retain the bobbins and the rotor in the housing. The bearing ends of the bobbin assemblies define the ends of the motor, thereby eliminating the need to provide separate end plates, and eliminating the steps of mounting bearings in the end plates and mounting the end plates on the motor.

Since the motor of the present invention incorporates fewer parts than the prior art motors, it is more easily assembled than the prior art motors and thereby more readily lends itself to robotic assembly, can be produced more economically and be made more reliable than prior art stepper motors.

Figure 3:
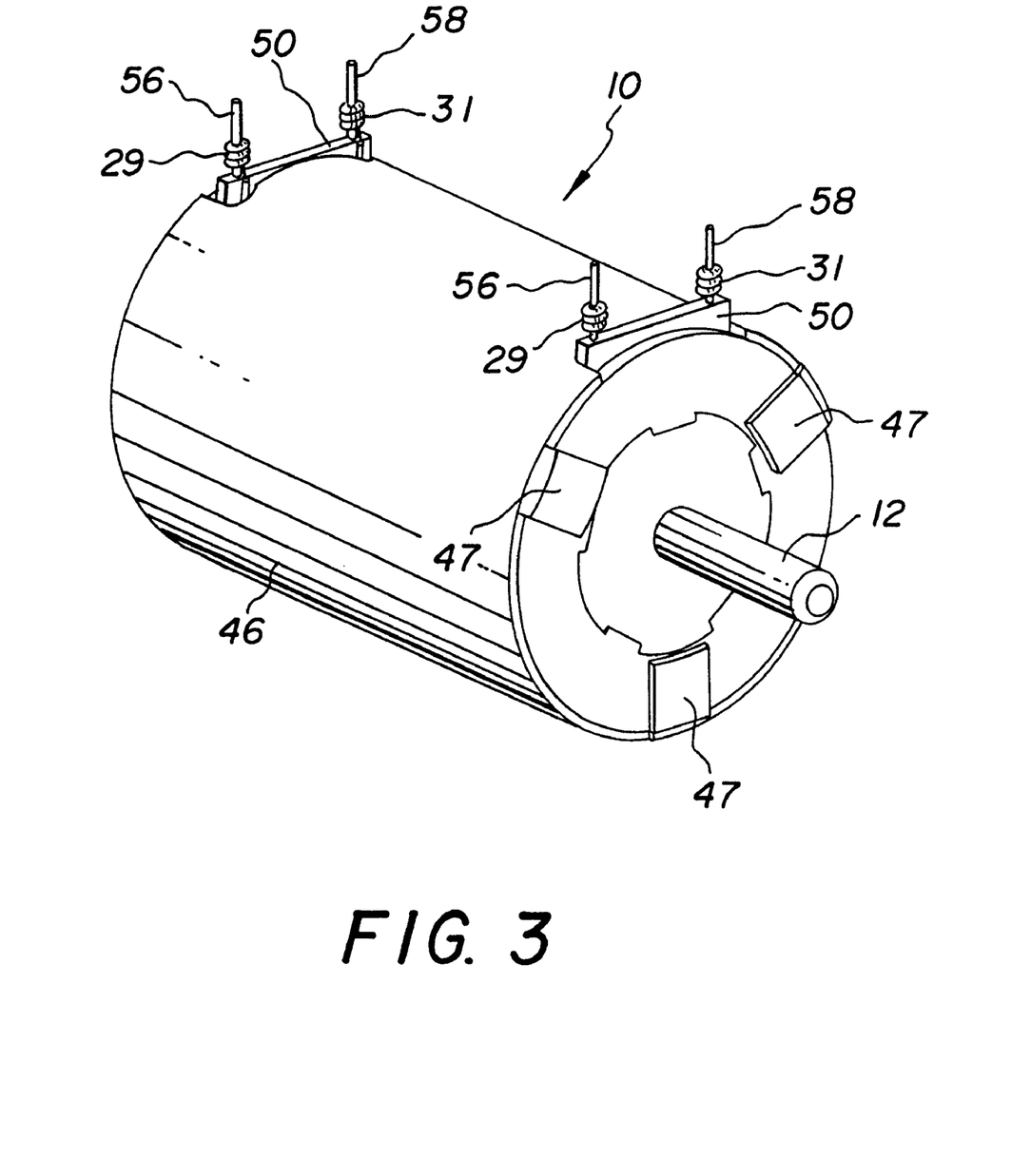
FIG. 3 is a perspective view of an assembled stepper motor according to the present invention.

FIG. 3 shows a perspective view of the completed stepper motor 10. Typical stepper motors according to the present invention measures 8–20 mm in outside diameter, with a 4–10 mm diameter rotors.

Figure 4:
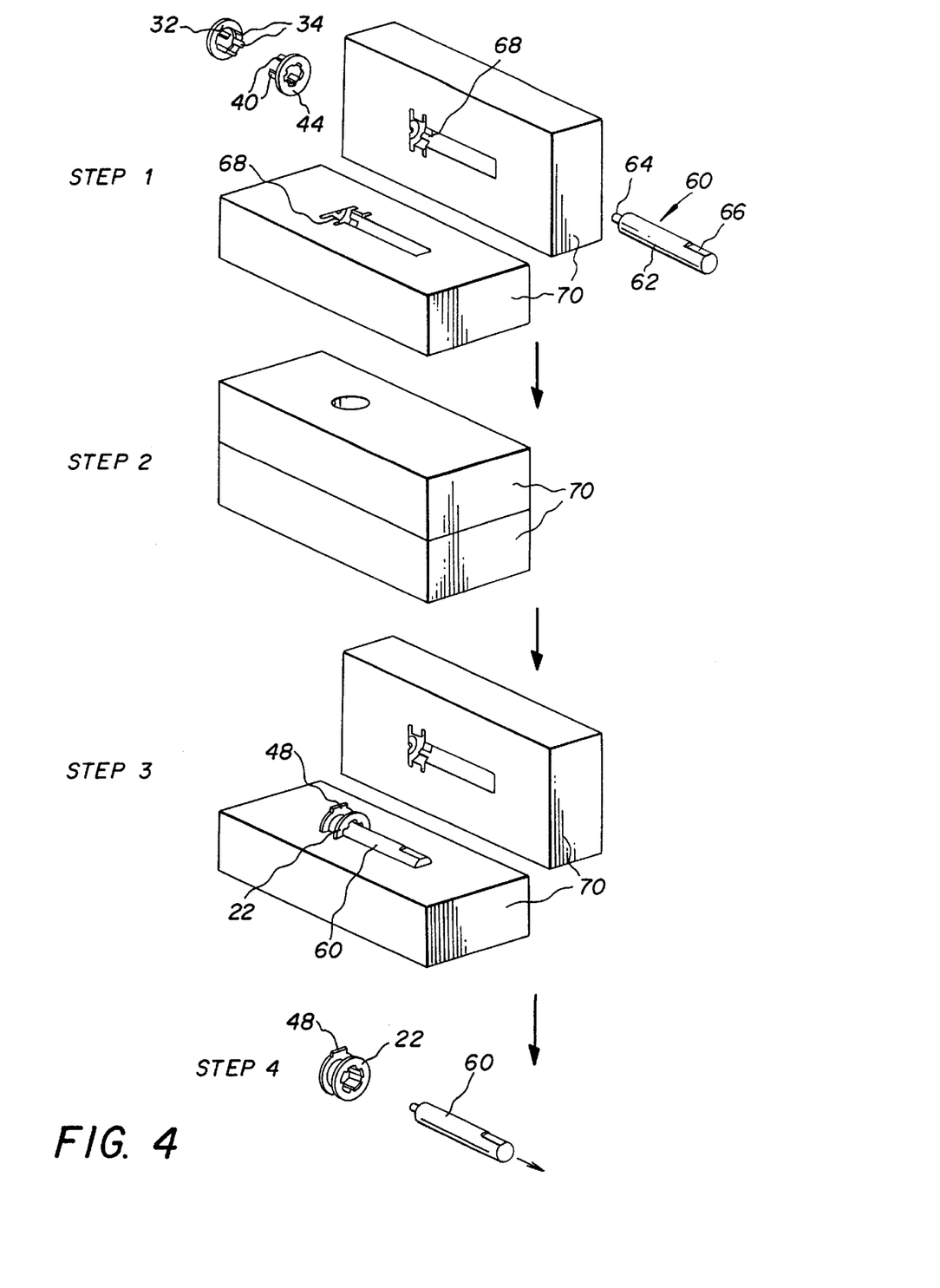
FIG. 4 is a schematic diagram illustrating the process of forming a bobbin having an integral bearing and stator by insertion molding.

Referring to FIG. 4, one method of manufacturing a bobbin with stator yokes by insertion molding according to the present invention will be described. In step 1, a pair of stator yokes 32 and 44 formed from soft iron sheet by a compound punch and die are placed on a mandrel 60. The mandrel 60 has a first portion 62 that is slightly larger in diameter than the rotor 11 for forming the passage in the bobbin that receives the rotor and a second portion 64 that is slightly larger in diameter than the rotor shaft 12 for forming the bearing in the end of the bobbin. The mandrel 60 includes an alignment feature 66 for aligning the mandrel in an injection mold. The stator yokes 32 and 34 are placed on the mandrel 60 so that their fingers 34 and 40 are interdigitated and aligned in a preferred orientation with respect to the alignment feature 66 on the mandrel 60. The mandrel 60 bearing the stator yokes 32 and 44 is placed in the cavity 68 of an injection mold 70. The injection mold cavity 68 is configured for forming the bobbin, having bearing and alignment features, around the stator yokes.

In step 2, the mold 70 is closed and plastic is injected into the cavity 68. In step 3, after the plastic for forming the bobbin has been injected and allowed to cool, the mold 70 is opened. In step 4, the mandrel 60 and bobbin 22 are removed from the mold and the completed bobbin 22 is removed from the mandrel 60.

Figure 5:
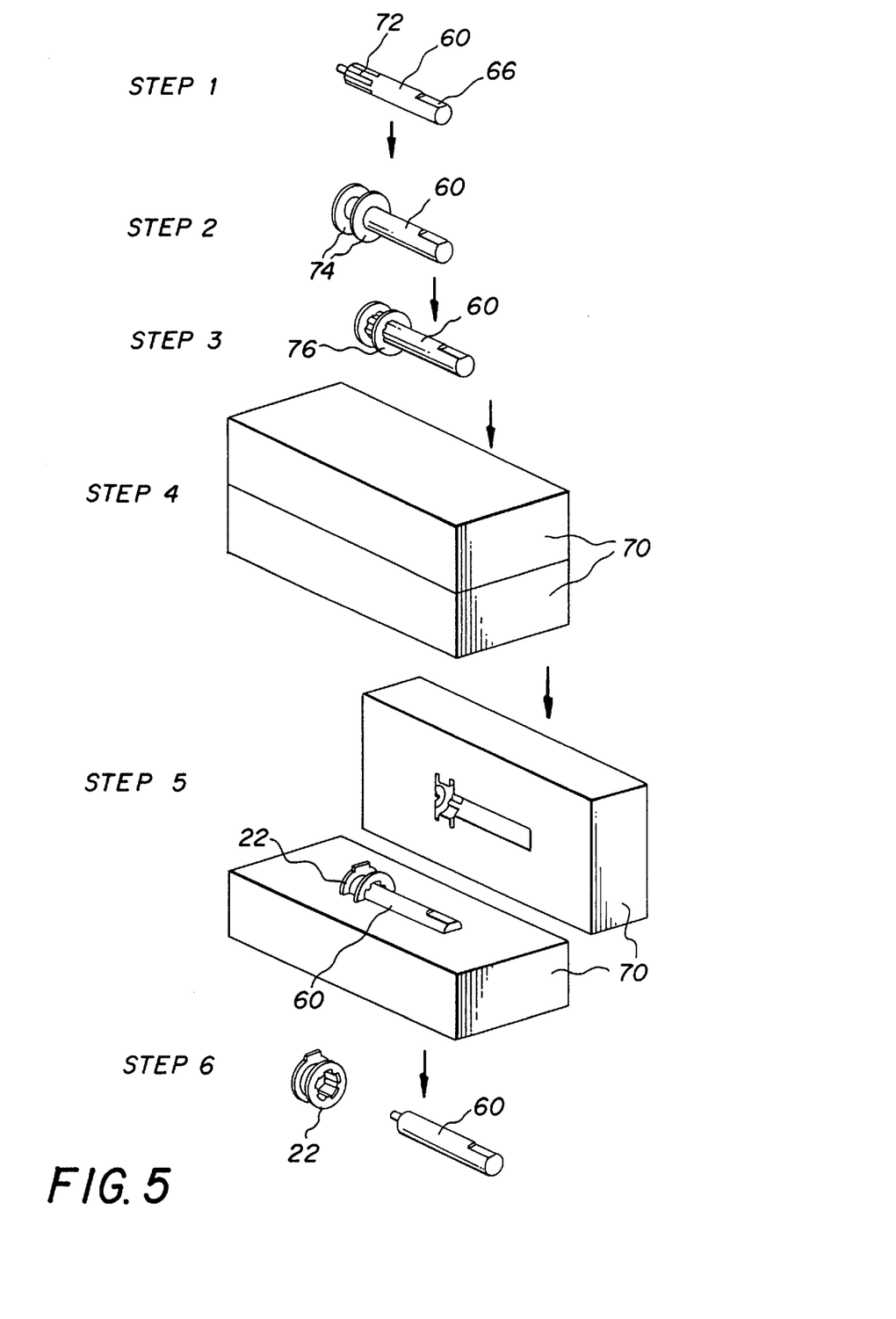
FIG. 5 is a schematic diagram illustrating the process of forming a bobbin having an integral bearing and stator by an electroforming and insertion molding process.

Referring to FIG. 5, an alternative method for forming the bobbin with the stator yokes by electroforming and insertion molding will be described. In step 1, the mandrel 60 is coated with a release agent and a conductive pattern 72 representing the stator fingers is formed on the mandrel 60 by well known photolithographic techniques. The conductive pattern 72 is formed in a preferred orientation with respect to the alignment feature 66 on the mandrel 60. In step 2, platable plastic end caps 74 are placed on the mandrel at the ends of the conductive pattern 72. In step 3, a layer of soft magnetic material is electroformed onto the conductive pattern 72 and platable end caps 74 to form the electroformed stator yokes 76. In step 4, the mandrel bearing the electroformed stator yokes is placed in the cavity of a mold 70, similar to the mold described with respect to FIG. 4, and plastic is injected into the mold.

In step 5, mold 70 is opened and the mandrel and bobbin are removed. In step 6, the mandrel 60 is removed from the completed bobbin 22. The electroforming method enables the formation of more uniform stator fingers that are more accurately located on the inside of the bobbin. This method is particularly useful for making very small motors, e.g. less than 6 mm in diameter.

Figure 6:
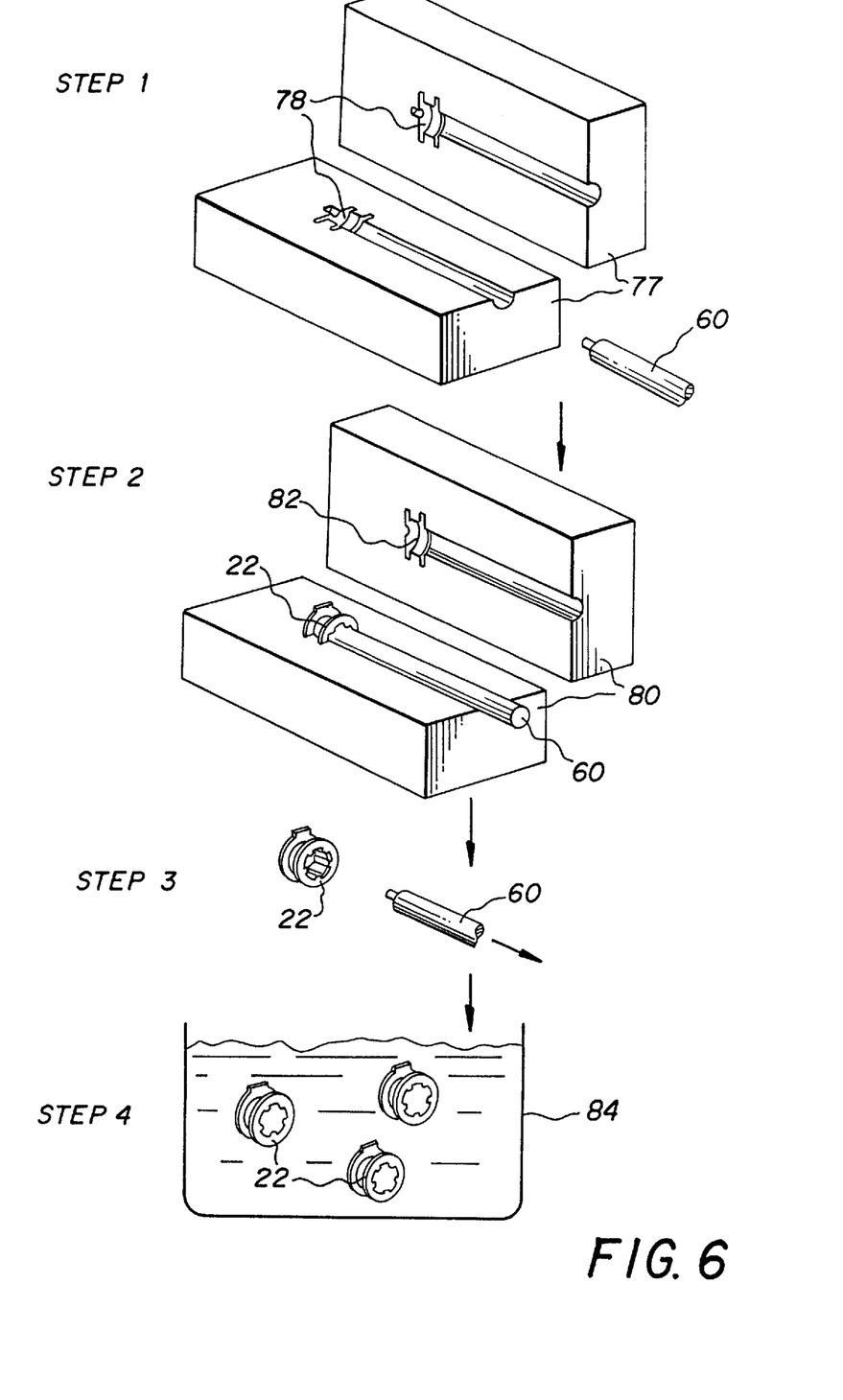
FIG. 6 is schematic diagram illustrating the process of forming a bobbin having an integral bearing and stator by a two step molding and bulk plating process.

Referring to FIG. 6, a further alternative method for forming the bobbin with stator yokes by two step injection molding and plating will be described. In the first step, a mold 77, has a cavity 78 that is configured to produce a portion of the bobbin that will not be plated when forming the stator yokes. A mandrel 60, is placed in the mold cavity to provide the inside diameters of the bearing and rotor passage as described above. A first non-platable plastic is injected into mold 70. In step 2, the mandrel bearing the first molded plastic features is removed from the mold 77 and placed in a second mold 80 having a cavity 82, slightly larger than cavity 78 in areas that will be plated to form the stator yokes. The mold 80 is closed and a second platable plastic is injected to form a plastic bobbin having platable areas where the stator yokes will be formed.

In step 3, mandrel 60 is removed from the plastic bobbin 22. In step 4, a number of plastic bobbins 22 are placed in a bulk plating tank 84, and soft magnetic material is plated onto the platable plastic portions of the bobbins to form the stator yokes. This process is less expensive than the electroforming technique described above, however the mold is more complex. It will be understood that the two step molding process may be performed in a single complex mold by moving mold parts to provide the additional volume for the platable plastic after the non-platable plastic has been injected.

The invention has been described with reference to a preferred embodiment. However, it will be appreciated that variations and modifications can be effected by a person of ordinary skill in the art without departing from the scope of the invention.

PARTS LIST
10 stepper motor
11 magnet rotor
12 shaft
14 front bearing
16 back bearing
18 front end plate
20 back end plate
22 plastic bobbin
24 plastic bobbin
26 coil
28 coil
29 coil lead
30 stator yoke
31 coil lead
32 stator yoke
34 stator finger
36 stator shell
38 stator shell
40 stator finger
42 stator yoke
44 stator yoke
46 motor housing
47 housing tabs
48 alignment tabs
50 alignment tabs
52 alignment cutout
54 alignment cutout
56 electrical termination pin
58 electrical termination pin
60 mandrel
62 first mandrel portion
64 second mandrel portion 66 alignment feature
68 mold cavity
70 injection mold
72 conductive pattern
74 platable plastic end caps
76 electroformed stator yokes
77 injection mold
78 mold cavity
80 injection mold
84 bulk plating tank

We claim:

1. A method of making a stepper motor, comprising the steps of:
   a. providing a permanent magnet rotor having an output shaft;
   b. providing a pair of bobbins, each bobbin having a passage for receiving the permanent magnet rotor, a bearing for supporting the output shaft, and a magnetically soft stator yoke formed in and located around the inside of the passage, wherein the step of providing the pair of bobbins, includes steps of forming each bobbin by;
      i. forming the stator yoke by stamping;
      ii. placing the stator yoke on a mandrel;
      iii. placing the mandrel in a mold cavity which is configured for forming the bobbin having the bearing opening and an alignment feature on the bobbin and injecting plastic into the mold cavity; and
      iv. withdrawing the mandrel from the bobbin
   c. providing a motor housing having a corresponding alignment feature complimentary to the alignment feature on the bobbin to align the bobbin with the motor housing;
   d. winding a coil of electrically conducting wire around each of the bobbins;
   e. inserting one of the bobbins into the motor housing;
   f. inserting the permanent magnet rotor into the motor housing whereby the output shaft is supported by the bearing in the one bobbin; and
   g. inserting the other bobbin of the pair of bobbins into the motor housing.

2. A method of making a stepper motor, comprising the steps of:
   a. providing a permanent magnet rotor having an output shaft;
   b. providing a pair of bobbins, each bobbin having a passage for receiving the permanent magnet rotor, a bearing for supporting the shaft output, and a magnetically soft stator yoke formed in and located around the inside of the passage, wherein the step of providing the pair of bobbins, includes steps of forming each bobbin by;
      i. providing a mandrel;
      ii. placing platable plastic end caps on the mandrel and electroforming the stator yoke on the mandrel;
      iii. placing the mandrel in a mold cavity which is configured for forming the bobbin having the bearing and an alignment feature on the bobbin and injecting plastic into the mold cavity; and
      iv. withdrawing the mandrel from the bobbin
   c. providing a motor housing having a corresponding alignment feature complimentary to the alignment feature on the bobbin to align the bobbin with the motor housing;
   d. winding a coil of electrically conducting wire around each of the bobbins;
   e. inserting one of the bobbins into the motor housing;
   f. inserting the permanent magnet rotor into the motor housing whereby the output shaft is supported by the bearing in the one bobbin; and
   g. inserting the other bobbin of the pair of bobbins into the motor housing.

3. A method of making a stepper motor, comprising the steps of:
   a. providing a permanent magnet rotor having an output shaft;
   b. providing a pair of bobbins, each bobbin having a passage for receiving the permanent magnet rotor, a bearing for supporting the output shaft, and a magnetically soft stator yoke formed in and located around the inside of the passage, wherein the step of providing the pair of bobbins, includes steps of forming each bobbin by:
      i. forming the bobbin by two step injection molding including; a first step employing a first mold cavity configured to produce a first portion of the bobbin that is not be plated, and injecting a first mold plastic that is non-platable into the first cavity, and a second step employing a second mold cavity slightly larger than the first mold cavity defining a second portion of the bobbin for electroplating the stator yokes onto the second portion to, form the stator yokes, and injecting a second mold plastic that is platable into the second cavity; and
      ii. electroplating the stator yoke onto the second portion of the bobbin;
   c. providing a motor housing;
   d. winding a coil of electrically conducting wire around each of the bobbins;
   e. inserting one of the bobbins into the motor housing;
   f. inserting the permanent magnet rotor into the motor housing whereby the output shaft is supported by the bearing in the one bobbin; and
   g. inserting the other bobbin of the pair of bobbins into the motor housing.

4. A method of making a bobbin for a stepper motor by forming the bobbin with a stator yoke and a mandrel to assemble the bobbin and the stator yoke to a permanent magnet rotor carried by an output shaft, comprising the steps of:
   a. forming the stator yoke by stamping from a sheet of soft magnetic material;
   b. placing the stator yoke on the mandrel having a first portion for defining a passage within the bobbin for receiving the permanent magnet rotor and a second portion for defining a bearing for the output shaft;
   c. placing the mandrel in a mold cavity which is configured for forming the bobbin having the bearing and an alignment feature for aligning the bobbin with a motor housing having a corresponding alignment feature and injecting plastic into the mold cavity; and
   d. withdrawing the mandrel from the bobbin.

5. A method of making a bobbin for a stepper motor by forming the bobbin with a stator yoke and a mandrel to assemble the bobbin and the stator yoke to a permanent magnet rotor carried by an output shaft, comprising the steps of:
   a. providing the mandrel having a first portion for defining a passage within the bobbin for receiving the permanent magnet rotor and a second portion for defining a bearing for the output shaft;

b. placing platable plastic end caps on the mandrel and electroforming the stator yoke on the first portion of the mandrel;

c. placing the mandrel in a mold cavity which is configured for forming the bobbin having the bearing and an alignment feature for aligning the bobbin with a motor housing having a corresponding alignment feature and injecting plastic into the mold cavity; and d. withdrawing the mandrel from the bobbin.

6. A method of making a bobbin for a stepper motor by forming the bobbin with a stator yoke and a mandrel to assemble the bobbin and the stator yoke to a permanent magnet rotor carried by an output shaft, comprising the steps of:

a. forming a bobbin by two step injection molding including; a first injection step employing a first mold cavity configured to produce a first portion of the bobbin that is not plated, and injecting a first plastic that is non-platable into the first mold cavity to define the first portion of the bobbin which is not in contact with the stator yoke, and to define a bearing for receiving the output shaft and a passage for receiving the stator yoke, and a second injection step employing a second mold cavity slightly larger than the first mold cavity defining a second portion of the bobbin for electroplating the stator yokes onto the second portion to form the stator yokes, and injecting plastic that is platable into the second mold cavity to define the second portion of the bobbin which is in contact with the stator yoke; and b. electroplating the stator yoke onto the second portion of the bobbin.

* * * * *